United States Patent [19]

Chacour

[11] 4,049,361
[45] Sept. 20, 1977

[54] RUNNER SEALS FOR HYDRAULIC TURBINES

[75] Inventor: Selim A. Chacour, York, Pa.

[73] Assignee: Allis-Chalmers Corporation, Milwaukee, Wis.

[21] Appl. No.: 726,450

[22] Filed: Sept. 24, 1976

Related U.S. Application Data

[63] Continuation of Ser. No. 575,736, May 8, 1975, abandoned.

[51] Int. Cl.² .................. F01D 11/00; F16J 15/50
[52] U.S. Cl. .................. 415/170 A; 277/26; 415/110; 415/130; 415/500
[58] Field of Search ......... 415/110, 111, 134, 136, 415/138, 170 A, 170 B, 500; 277/26

[56] References Cited

U.S. PATENT DOCUMENTS

| | | | |
|---|---|---|---|
| 1,072,650 | 9/1913 | Price | 415/106 |
| 1,114,238 | 10/1914 | Doble | 415/170 A |
| 1,163,243 | 12/1915 | Krogh | 415/106 |
| 1,516,822 | 11/1924 | McCormack | 415/106 |
| 2,082,927 | 6/1937 | White | 415/110 |
| 2,270,054 | 1/1942 | Hogan | 415/170 A |
| 2,818,227 | 12/1957 | Suss | 415/110 |
| 3,020,850 | 2/1962 | Meckenstock | 415/110 |
| 3,350,059 | 10/1967 | Sproule | 415/168 |
| 3,360,238 | 12/1967 | Koeller et al. | 415/168 |
| 3,927,951 | 12/1975 | Mitsuhashi | 415/110 |

FOREIGN PATENT DOCUMENTS

| | | | |
|---|---|---|---|
| 205,863 | 3/1959 | Austria | 415/109 |
| 619,413 | 5/1961 | Canada | 415/500 |
| 972,528 | 8/1950 | France | 415/170 A |
| 205,313 | 4/1908 | Germany | 415/109 |
| 914,214 | 5/1954 | Germany | 415/109 |
| 28,573 | 3/1903 | Switzerland | 415/106 |

Primary Examiner—C. J. Husar
Attorney, Agent, or Firm—John P. Hines

[57] ABSTRACT

A seal is provided between the turbine runner and the stationary structure which permits expansion of the runner without danger of contacting the stationary structure and thereby causing the seal to seize. The portion of the runner which defines the sealing passage faces radially inwardly. Therefore, if the runner expands, the sealing clearance will enlarge rather than decrease thereby overcoming the possibility of seizure.

3 Claims, 1 Drawing Figure

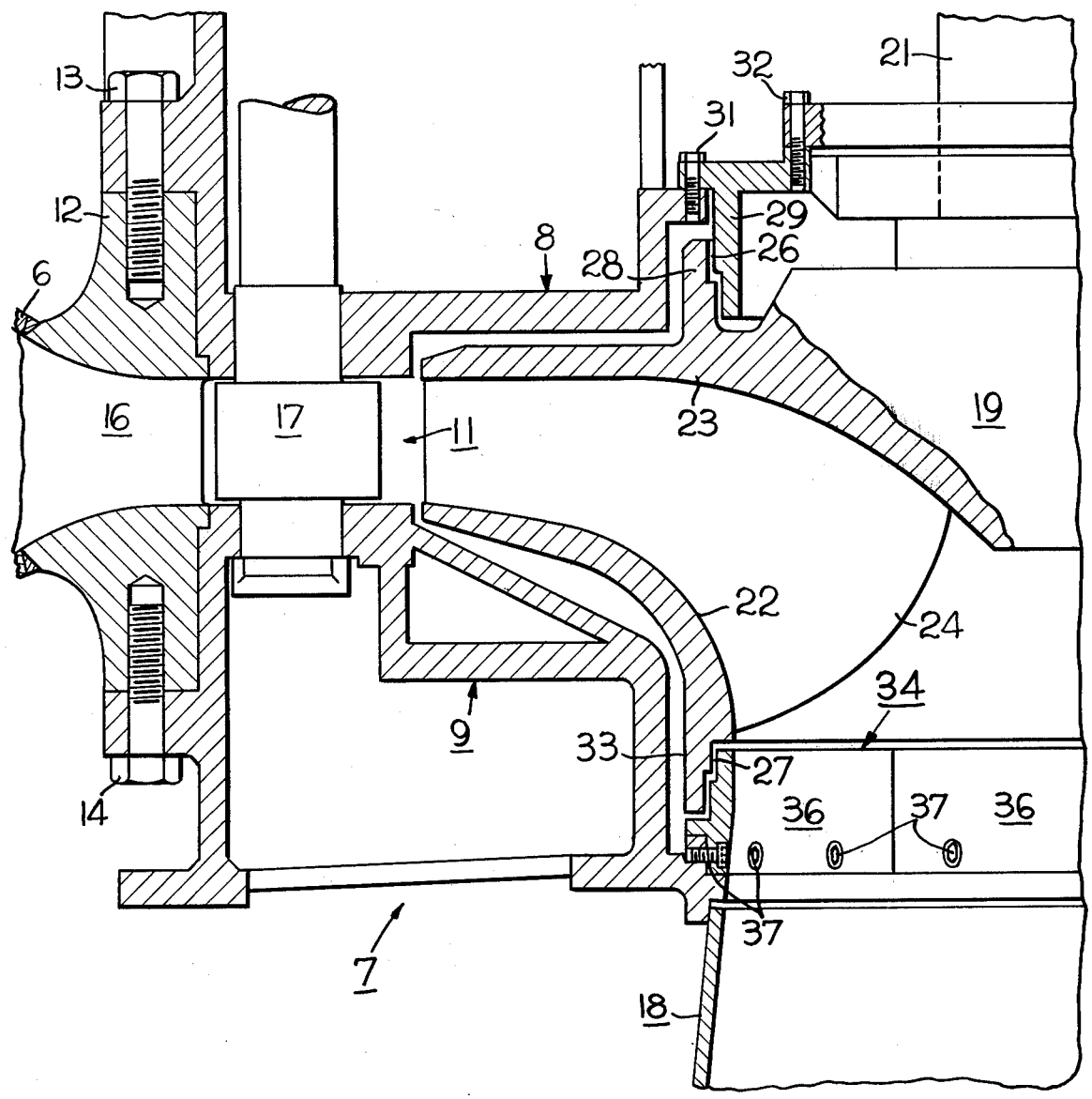

RUNNER SEALS FOR HYDRAULIC TURBINES

This is a continuation of application Ser. No. 575,736, filed May 8, 1975, now abandoned.

This invention relates in general to hydraulic turbines and more particularly to an improved sealing arrangement between the runner and the turbine stationary structure.

In many installations it is desirable to operate a generator, normally driven by a hydraulic turbine, as a motor for the purpose of utilizing the inductive capacity of the generator to improve the power factor of the electric distribution line. When the generator is so used as a synchronous condenser, only wattless power should be drawn from the line. The work to be done by the motoring generator should therefore be minimized and should be limited to overcome friction and windage in the generator and the turbine. The work required to motor the generator can be decreased substantially by dewatering the turbine. This is accomplished by depressing the water level below the level of the runner by admitting pressurized air into the turbine.

However, when the turbine is rotating in air, the water normally passing through the turbine is not available for cooling the runner seals. If the seals are not properly cooled, the temperature of the adjacent surfaces of the seals increases causing expansion and in some instances, the seals actually contact and seize. When seizure does occur, excessive damage usually results. Furthermore, seizure of the runner seals usually requires an expensive major dismantling of the turbine including removal of the runner to free the seized seal elements.

This problem can be overcome to some degree by increasing the seal clearance. However, as the seal clearance increases, the efficiency of the machine decreases. Therefore, machine designs usually attempt to compromise these two seemingly contradictory factors. In those installations where efficiency is at a premium the seal clearance is decreased and the danger of seizure is increased.

An example of one prior art patent which shows structure aimed at reducing the major dismantling requirements resulting from seal seizure is disclosed in U.S. Pat. No. 3,180,613 issued Apr. 27, 1965. This patent is directed to a means of simplifying the dismantling requirements after seizure has occurred rather than to a mechanism which prohibits seizure from occurring.

The following listed patents show runner seals for rotating machinery. It is not intended that this list is exhaustive of similar prior art but is merely representative of similar prior art which was uncovered in a non-exhaustive search of the prior art. U.S. Pat. No. 1,516,095 issued Nov. 18, 1924; U.S. Pat. No. 2,818,227 issued Dec. 31, 1957; U.S. Pat. No. 3,079,866 issued Mar. 5, 1963; and U.S. Pat. No. 3,350,059 issued Oct. 31, 1967.

It is the intention and general object of this invention to provide a hydraulic turbine with runner sealing structure which overcomes the possibility of seizure due to runner expansion.

Another object of the subject invention is to provide a hydraulic turbine of the hereinbefore described type with runner seals wherein the seal clearance or gap increases as the runner expands.

An additional object of the subject invention is to provide a hydraulic turbine of the hereinbefore described type wherein the sealing gap or restricted fluid passage is defined by a radially inner facing surface of the runner and a radially outer facing surface of the stationary structure of the turbine.

A further object of the subject invention is to provide a hydraulic turbine of the hereinbefore described type wherein the stationary sealing element is a throat ring releasably connected to the stationary structure to provide a streamline flow path between the runner and the turbine draft tube.

A more specific object of the subject invention is to provide a hydraulic turbine of the hereinbefore described type wherein the stationary sealing elements are releasably attached to the turbine to permit easy removal thereof without requiring a major dismantling of the turbine.

These and other objects of the subject invention will become more fully apparent as the following description is read in light of the attached drawing which shows a partial vertical sectional view of a Francis type turbine incorporating the subject inventive features.

Referring more particularly to the drawings, the referenced numeral 6 designates a portion of a spiral casing to which water is delivered from the usual penstock (not shown). The spiral casing 6 is, in the usual case, embedded in concrete and the turbine stationary structure generally designated 7 is provided in the annular cavity defined by the concrete. A head cover generally designated 8 and a discharge ring generally designated 9 define a fluid passageway 11. A stay ring structure 12 rigidly connected to spiral case 6 as by welding is connected to the head cover 8 by bolts 13 and to the discharge ring 9 by bolts 14. The stay ring 12 defines an annular opening 16 which connects the passageway 11 to the spiral case 6. A plurality of circumferentially spaced wicket gates 17 are pivotally mounted in the head cover and discharge ring to permit and interrupt the flow of water through the passageway 11. A draft tube generally designated 18 is rigidly connected to the discharge ring 9.

The turbine runner generally designated 19 is rotatably supported within the turbine stationary structure on a shaft partially shown at 21 in any suitable bearing means (not shown). The turbine shown for purposes of illustration is of the Francis type and includes a band element 22 and a crown element 23. A plurality of circumferentially spaced vanes 24 are supported between the band and crown elements.

Sealing means in the form of restricted fluid passages 26 and 27 are provided between the runner 19 and the stationary structure 7. The restricted fluid passage 26 is defined by an annular upstanding shoulder 28 connected to the runner crown 23 and a stationary ring 29 connected to the turbine head cover 8. The shoulder 28 may be connected to the crown 23 in any conventional manner and is herein shown as being formed integral with the crown. The stationary ring member 29 may be provided in arcuate segments releasably connected to the head cover. As herein shown for purposes of illustration, this releasable connection is accomplished with bolts 31 and 32 as shown.

As herein shown for purposes of illustration, the restricted fluid passage 27 is defined by the end portion 33 of the band element 22 and an annular throat ring designated 34. The annular throat ring 34 may be composed of a plurality of arcuate segments 36 releasably connected to the turbine stationary structure 7 by means of a plurality of circumferentially spaced recessed bolts 37.

As shown, the throat ring 34 is located between the bottom portion of the runner 19 and the upper end of the draft tube 18 and provides a streamlined water flow path therebetween.

As can be seen from the patent drawing, one wall of each of the restricted fluid passageways 26 and 27 is defined by a radially inner facing surface of the crown and band elements respectively. With this arrangement, when the runner expands as for instance due to overheating, the runner will expand radially outwardly thereby causing the shoulder 28 and end portion 33 to move radially away from their respective complementary stationary sealing elements 29 and 34 respectively. With this arrangement, the problem of seizure between the runner sealing elements has been overcome. Furthermore, since the remaining radially outwardly facing surfaces of the runner are spaced a greater distance from the turbine stationary structure than the maximum expansion of the runner, no seizure will occur between any portion of the runner and the stationary structure of the turbine.

With this arrangement, a small clearance can be provided between the runner seals because expansion of the runner will not result in a decrease in this clearance. In the past, a larger clearance was required so that when the turbine was, for instance, used as a synchronous condenser without water flowing through the turbine, thermal expansion could be accommodated to decrease the seal clearance and lessen the danger of actual contact occurring between the rotating and stationary portions of the seal. Because of this larger clearance, some efficiency in the machine was sacrificed. With applicant's arrangement, the small clearance can be maintained while the turbine is operating normally because of ample cooling effect of the water passing through the turbine. However, when the turbine is running as a synchronous condenser, a small clearance is not necessary since the turbine is not producing power and therefore, the larger clearance due to expansion can be accepted.

Additional advantageous features of this invention reside in the easily removable stationary sealing elements. The throat ring 34 is composed of segments having a length which is less than the diameter of the draft tube. Therefore, when the water is depressed below the level of the throat ring, workmen can enter the turbine and remove the throat ring segments 36 without requiring a removal of the runner. In like manner, the stationary crown sealing element 29 can be removed by removing the bolts 31 and 32 without the necessity of removing the head cover 8.

The embodiments of the invention in which an exclusive property or privilege is claimed are defined as follows:

1. A water turbine comprising:
a vertically disposed runner composed of vertically spaced crown and band elements connected together by a plurality of runner vanes, said runner having a radially disposed intake and a vertically disposed discharge opening; an annular stationary discharge ring disposed adjacent to and beneath said band element and defining an opening therethrough coaxial with said runner discharge opening; a stationary head cover disposed adjacent to and above said crown element; a draft tube connected to said discharge ring and defining a water passageway coaxial with said discharge ring opening and vertically spaced from the end of said runner defining said discharge opening; an annular substantially axially directed first sealing surface formed on the radially inner facing surface of the lower end of said band element; a throat ring releaseably connected to the lower end of said discharge ring providing a radially inner facing surface mating with said draft tube and said runner discharge opening to form a surface continuation of said water passageway; and an annular substantially axially outer facing surface of said throat ring cooperating with said first sealing surface to form therebetween a restricted water passage, all radially outer facing surfaces of said runner being spaced from any surface of said stationary structure a distance greater than the distance between the surfaces forming said restricted water passage.

2. The water turbine set forth in claim 1 and further comprising an annular upstanding shoulder connected to said crown and having a radially inwardly facing sealing surface thereon; and an annular depending stationary ring releaseably connected to said head cover and having a radially outwardly facing surface cooperating with said radially inwardly facing surface of said upstanding shoulder to provide a restricted water passage therebetween.

3. The water turbine set forth in claim 1 wherein said throat ring is constructed of a plurality of arcuate sections connected to said discharge ring by a plurality of circumferentially spaced releasable attaching means which are accessible and removable from the interior of said stationary structure, the length of each of said throat ring sections being less than the diameter of said draft tube.

* * * * *